United States Patent
Milanese et al.

(10) Patent No.: US 10,554,775 B2
(45) Date of Patent: *Feb. 4, 2020

(54) PRESENTING NOTIFICATIONS TO A USER OF A COMPUTING DEVICE

(71) Applicant: International Business Machines Corporation, Armonk, NY (US)

(72) Inventors: Nicola Milanese, Rome (IT); Stefano Sidoti, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/813,434

(22) Filed: Nov. 15, 2017

(65) Prior Publication Data

US 2019/0109918 A1 Apr. 11, 2019

Related U.S. Application Data

(63) Continuation of application No. 15/729,857, filed on Oct. 11, 2017.

(51) Int. Cl.
*H04L 29/08* (2006.01)
*H04L 12/58* (2006.01)
*G06F 3/16* (2006.01)
*G06Q 10/10* (2012.01)

(52) U.S. Cl.
CPC .............. *H04L 67/26* (2013.01); *G06F 3/167* (2013.01); *H04L 51/26* (2013.01); *H04L 67/306* (2013.01); *G06Q 10/107* (2013.01)

(58) Field of Classification Search
CPC .. G06F 16/24575; G06F 9/542; G06F 13/128; G06F 13/122; G06F 9/452; G06F 11/2289; H04L 67/26; H04L 67/303; H04L 67/306; H04L 51/24; H04L 51/26; H04B 1/385; H04W 4/12
See application file for complete search history.

(56) References Cited

U.S. PATENT DOCUMENTS 7,203,294 B2 4/2007 Carnazza et al.
2013/0346521 A1 12/2013 Arabo et al.
2014/0258883 A1 9/2014 Duarte et al.
(Continued)

OTHER PUBLICATIONS

Office Action dated Mar. 21, 2019, regarding U.S. Appl. No. 15/729,857, 14 pages.
(Continued)

*Primary Examiner* — Kyung H Shin
(74) *Attorney, Agent, or Firm* — Yee & Associates, P.C.

(57) ABSTRACT

Presenting notifications to one or more computing devices of a user is provided. A notification is received addressed to a client service running on a computing device of one or more computing devices of the user. The notification is classified based on content associated with the notification. User context of the user is determined based on user-related information received from the one or more computing devices. The notification is presented to one or more of the one or more computing devices of the user according to one or more modes of presentation, based on classifying the notification and determining the user context.

14 Claims, 3 Drawing Sheets

(56) References Cited

U.S. PATENT DOCUMENTS

| | | | |
|---|---|---|---|
| 2016/0085698 A1* | 3/2016 | Mikkola | G06F 13/128 |
| | | | 710/8 |
| 2016/0248865 A1 | 8/2016 | Dotan-Cohen et al. | |
| 2017/0034649 A1 | 2/2017 | Dotan-Cohen et al. | |
| 2017/0099592 A1* | 4/2017 | Loeb | H04L 67/303 |
| 2017/0118162 A1 | 4/2017 | Ratiu et al. | |
| 2017/0134516 A1 | 5/2017 | Gutman et al. | |
| 2017/0185650 A1* | 6/2017 | Vainas | G06F 16/24575 |
| 2017/0316320 A1* | 11/2017 | Jamjoom | H04L 51/24 |
| 2018/0077097 A1* | 3/2018 | Alfaro | H04L 51/12 |

OTHER PUBLICATIONS

Kalyanam et al., "The Perfect Message at the Perfect Moment", Harvard Business Review, Nov. 2005, 17 pages. https://hbr.org/2005/11/the-perfect-message-at-the-perfect-moment.

McCrickard et al., "A Model for Notification Systems Evaluation—Assessing User Goals for Mulittasking Activity", ACM Transactions on Computer-Human Interaction, vol. 10, No. 4, Dec. 2003, pp. 312-338.

Pejovic et al., "Investigating the Role of Task Engagement in Mobile Inturruptibility", Proceedings of the 17th International Conference on Human-Computer Interaction with Mobile Devices and Services Adjunct, Aug. 2015, pp. 1100-1105.

Milanese et al., "Presenting Notification to a User of a Computing Device", filed Oct. 11, 2017, U.S. Appl. No. 15/729,997, 27 pages.

List of IBM Patents Treated as Related, dated Nov. 15, 2017, 2 pages.

Final Office Action, dated Jun. 18, 2019, regarding U.S. Appl. No. 15/729,857, 26 pages.

Office Action, dated Sep. 5, 2019, regarding U.S. Appl. No. 15/729,857, 39 pages.

* cited by examiner

PRESENTING NOTIFICATIONS TO A USER OF A COMPUTING DEVICE

FIELD

Certain embodiments of the invention relate to the field of digital computer systems and methods. More specifically, certain embodiments of the invention relate presenting notifications to a user of a computing device, and the methods therein.

DESCRIPTION OF RELATED ART

Every day we receive several notifications (mails, SMS, messages, etc.) on a variety of devices (desktop PCs, mobiles, smart TV, tablets, etc.). These notifications could be an issue when the time, the sender of the notification, the receiving device and/or the content of the notification are inappropriate to the receiving context of the user device. For example, during a meeting in which a user is making a presentation with a laptop computer, the laptop may receive a confidential notification addressed to the user, and may attempt to notify the user, interrupt the presentation of the user and/or even display the confidential notification or its contents to the audience. In another example, during watching of a cartoon with one's son or daughter on a smart TV, the smart TV may receive, notify, and/or display the notification corresponding to a not-safe-message or even the contents of the not-safe-message.

SUMMARY

According to one illustrative embodiment, a method for presenting notifications to one or more computing devices of a user is provided. A notification is received addressed to a client service running on a computing device of one or more computing devices of the user. The notification is classified based on content associated with the notification. User context of the user is determined based on user-related information received from one or more computing devices. The notification is presented to one or more of the one or more computing devices of the user according to one or more modes of presentation, based on the classification of the notification and the determining of the user context of the user.

DETAILED DESCRIPTION

Figure 1:
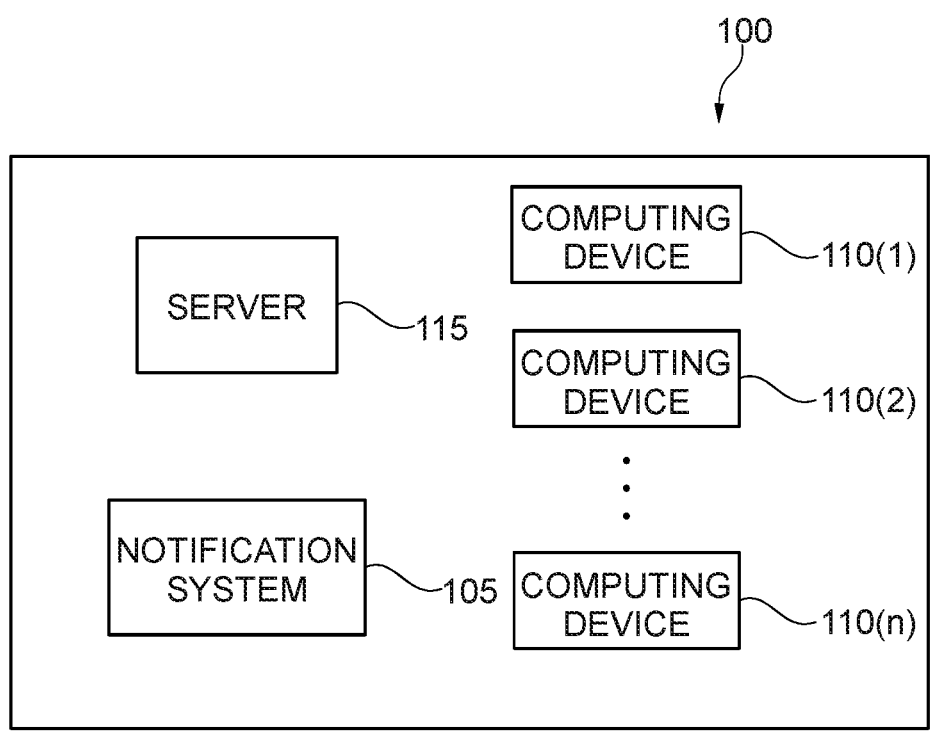
FIG. 1 is a schematic diagram of a network, according to an exemplary embodiment of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Illustrative embodiments of presenting a notification to one or more computing devices according to one or more modes of presentation is based on a classification of a received notification and a determination of user context, combined with the ability of the system to adapt the notification to standards set under different communication protocols that govern different client services running on the different computing devices. Moreover, the system has the capability to learn from a cumulation of past user-associated activity (i.e., past reactions of a user, or past choices a user may make, or measured biometric parameters of a user that may express user sentiment, all in conjunction with past presented notifications) in conjunction with classifications of the past presented notifications, and update the user context. As a result, user context includes past user history regarding, for example, past reactions of the user to presented notifications, past choices the user makes concerning presented notifications, measured biometric parameters of the user indicating user sentiment concerning presented notifications, and the like.

A computing device may include, but are not limited to, a mobile device, such as a smart phone, a notepad, a personal digital assistant, a computer, such as laptop or a distributed computer system, and a pager.

A notification may comprise, but is not limited to, an e-mail, a text message, such as an SMS or MMS, a chat message, a tweet, a Skype message, or any type of visual or audio message.

User context of the user is based upon user-related information, where the user-related information may comprise any information related to a user of a computing device.

A biometric parameter may comprise, but is not limited to, heart rate, blood pressure, body surface temperature, and pupil dilation, and may include any type of parameter that is an indicative of a biological reaction of a user upon seeing or hearing a notification presented on a computing device A mode of presentation may comprise an audio mode, a visual mode, or a combination of audio and visual modes, and may further comprise any type of technique of alerting a user (i.e., via a mode of alerting) to a notification received from the notification system. For example, the visual mode may include, but is not limited to, notifications formatted as text messages, e-mail messages, chat messages, Skype messages, tweets, and pictures, with modes of alerting comprising, for example, but not limited to, alarm modes and vibration modes.

Presenting notifications to one or more computing devices of a user may comprise receiving a notification addressed to a client service running on a computing device of the one or more computing devices of the user, classifying the notification based on content associated with the notification, determining user context of the user based on user-related information received from the one or more computing devices, and presenting the notification to one or more of the one or more computing devices of the user according to one or more modes of presentation, based on the classification of the notification and the determined user context of the user.

The above features of illustrative embodiments may have the advantage that the most appropriate computing device of one or more computing devices associated with a user are selected, and the most appropriate mode of presentation of the selected computing device is selected, for presenting a notification to a user. Furthermore, the above features of illustrative embodiments may have the advantage that the selection of the most appropriate computing device and the most appropriate mode of presentation are based on a classification of the notification and a determined user context of the user.

According to one embodiment, user-related information comprises a reaction of the user to at least one previously presented notification, and according to another embodiment, user-related information comprises an interaction of the user with one or more user interfaces of the one or more computing devices and calendar information related to the user. These features may have the advantage that selecting the most appropriate computing device of one or more computing devices associated with a user, and the most appropriate mode of presentation of the selected computing, for presenting a notification to a user, is based on how a user reacts to previously presented messages, and what the user is doing, respectively.

According to one embodiment, presenting the notification to the one or more of the one or more computing devices of the user according to the one or more modes of presentation is further based on one or more characteristics of the one or more of the one or more computing devices. These features may have the advantage that selecting the most appropriate computing device of one or more computing devices associated with a user, and the most appropriate mode of presentation of the selected computing, for presenting a notification to a user, is based on characteristics of the one or more of the one or more computing devices, in order to narrow the choices of selecting to only those computing devices that include the most appropriate characteristics for presenting the notification.

According to one embodiment, one or more client services are running on the one or more of the one or more computing devices being associated with different communication protocols than a communication protocol associated with the client service running on the computing device, and the method further comprises changing the communication protocol of the notification before presenting the notification to the one or more of the one or more computing devices. These features may have the advantage that the choices of computing devices to which a notification may be presented are broadened.

According to one embodiment, the determined user context is stored, and the determined content is updated based on recently-received user-related information from the one or more computing devices and the stored determined user context. These features may have the advantage that the notification system is enabled to learn, or in other words, be trained, so as to make more appropriate choices of computing devices and modes of presentation for presenting future notifications.

FIG. 1 is a schematic diagram of a network 100, according to an exemplary embodiment of the invention. In one embodiment of the invention, the network 100 may be a computer network, and may comprise a notification system 105, one or more computing devices 110, and a server 115. The one or more computing devices 110 may comprise any type of electronic device configured to receive any type of electronic notification (also referred to as a notification) via the network 100. For example, the computing devices 110 may include, but are not limited to, a mobile, a notepad, a personal digital assistant, a computer, such as laptop or a distributed computer system, and a pager.

The server 115 may provide one source of notifications for reception by the one or more computing devices 110 and/or the notification system 105. Furthermore, in another embodiment of the invention, the notification system 105, as will be discussed more fully below, may process and present notifications to the one or more computing devices 110.

In one embodiment, content of a notification may comprise a header and a body, where the header may comprise address information of the sender and the receiver (i.e., one or more of the computing devices 110), and the body may comprise message information, in the form of, for example, but not limited to, the body of an e-mail, a text message, such as an SMS or MMS, a chat message, a tweet, a Skype message, or any type of visual or audio message. However, the scope of the invention contemplates a notification governed under any communication protocol and standard.

A notification may not only comprise a header including address information and/or a body including message information, but may also comprise other content information, such as, but not limited to, subject information associated with the message information of the body, or a time that the notification was sent or a location from where the notification was sent. In one embodiment, and dependent upon the type of computing device that receives a notification from the notification system 105, the computing device 110 may display, or in other embodiments play, the address information of the header and/or the message information of the body and/or the other content information.

In one embodiment of the invention, the notification system 105 is configured to communicate with the computing devices 110 and optionally with the server 115 over the network 100. Communication over networks, such as network 100, is well known in the art, and includes wireless and wired communication, or any type of combination of wireless and wired. For example, wired communication may include communication mediums and/or standards such as cable, POTS, optical, Ethernet, etc., and wireless communication may include communication mediums and/or standards such as, for example, RF, WiFi, all IEEE protocols, Bluetooth, IR, near-field communications, and satellite communications.

As will be seen in more detail below in conjunction with FIGS. 2 and 3, the notification system 105 is configured to receive notifications from either the server 115 or one or more of the computing device 110. In one embodiment of the invention, the one or more computing devices 110 are configured, via for example, plug-ins, to forward or route any notification, received for example from the server 115, to the notification system 105 for further processing. In another embodiment, one or more components of the notification system 105 are configured to run, for example, as a type of filter on top of client services (not shown) running on one or more computing devices 110 for intercepting notifications before they are received by the client services. After such processing, the notification system 105 may present the processed notification to one or more selected computing devices of the one or more computing devices 110.

Figure 2:
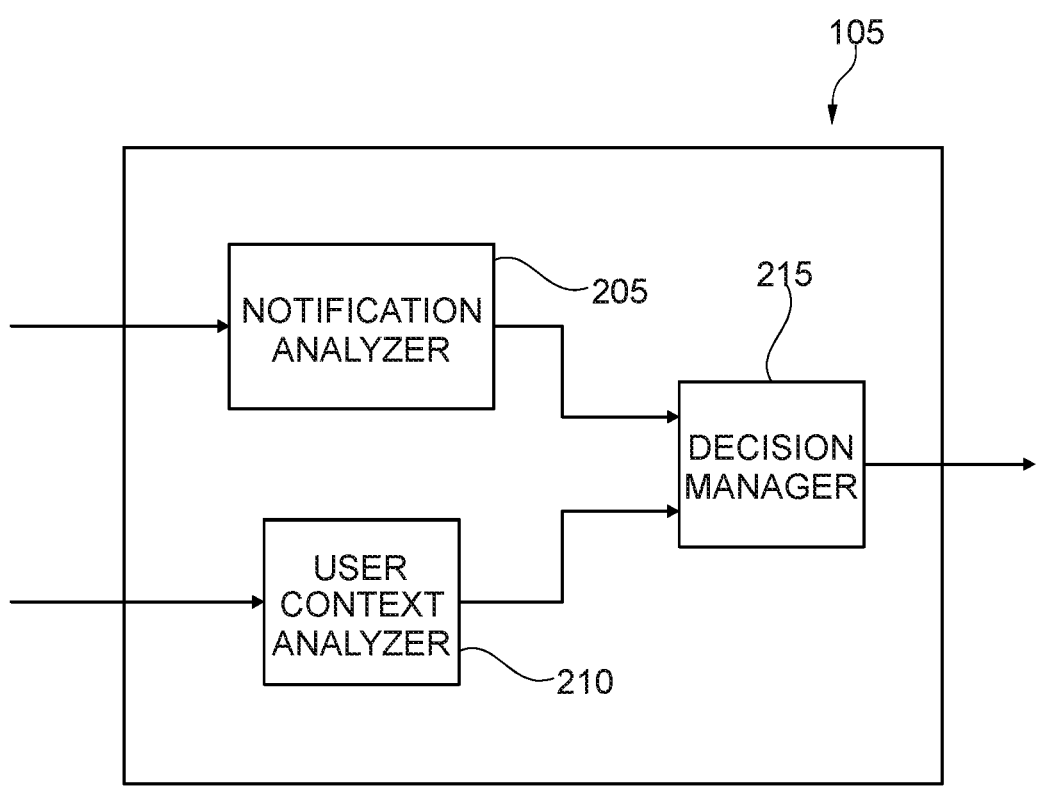
FIG. 2 is a schematic diagram of the notification system illustrated in FIG. 1, according to an exemplary embodiment of the invention.

FIG. 2 is a schematic diagram of the notification system 105 illustrated in FIG. 1, according to an exemplary embodiment of the invention. The notification system 105 comprises a notification analyzer 205, a user context analyzer 210, and a decision manager 215.

In one embodiment on the invention, the notification analyzer 205 is configured to receive a notification from a client service (not shown) running on a computing device, for example computing device 110(1) of the one or more computing devices 110. The one or more computing devices 110 may be associated with a given user. For example, a given user may have log-on privileges to the one or more computing devices 110 and/or access to client services running on the one or more computing devices 110.

In an exemplary embodiment, a client service running on the computing device 110(1) is a client electronic mail (i.e., e-mail) service. The client e-mail service may be configured, via a plug-in, for example, to receive a notification from the server 115 running, for example, an e-mail server program, and then transmit (e.g., route) the notification to the notification analyzer 205. In another embodiment, the client e-mail service may be configured, via a plug-in, for example, to store notifications received from the server 115, and the notification analyzer 205 may be configured to monitor the client services running on the one or more computing devices 110, such as the client e-mail service running on the computing device 110(1), for any stored notifications. Upon detection of stored notifications, the notification analyzer 205 may instruct the computing device 110(1) to transmit the stored notifications to the notification analyzer 205. In another embodiment of the invention, a user of the computing device 110(1) is not notified of the initial reception, or storage, of the notification from the server 115.

In yet another embodiment, the notification analyzer 205 may comprise a type of filter that is configured to run on top of the computing device 110(1) (e.g., on top of a client service running on the computing device 110(1)). The notification analyzer 205 may be further configured to intercept notifications sent from the server (e.g., sent from corresponding client program(s) running on the server) and addressed to the computing device and/or client service(s) running on the computing device, before they are received by the client service(s).

The scope of the invention is not limited to computing devices and servers running programs associated with e-mail services, but covers any type of notification services, such as, but not limited to, chat services, messaging services, audio services, video services, internet telephony services, or any combination of text, audio and/or video services, such as Skype, for example.

In another embodiment of the invention, the notification analyzer 205 may, after receiving the notification, classify the notification based on content associated with the notification. For example, in one embodiment, the notification analyzer 205 classifies the notification based on address information associated with the notification, such as sender and/or receiver addresses. The receiver address may be the address associated with a given client service running on a computing device 110. In another embodiment, the notification analyzer 205 classifies the notification based on message information of the received notification. Message information may be derived, for example, from an analysis of the semantic content of the notification, and may result in a detection of key words or phrases, or meaningful patterns, or correlations between patterns, or a detection of the urgency of the notification. In one embodiment, the notification analyzer 205 may include a text mining computer program, known by those of skill in the art to be available from many commercial and open source companies.

In one embodiment of the invention, the user context analyzer 210 is configured to receive user-related information from the one or more computing devices 110 of the user. In an embodiment, user-related information comprises any information related to a user of the one or more computing devices 110, and more precisely, may comprise information which relates to which computing devices 110 a user is currently using or may be using at a later time, to information which relates to the user and corresponding notifications, and to possible locations of a user. For example, user-related information may comprise information derivable from the interaction of the user with any of the user-interfaces of the computing devices 110, or information related to a user's schedule, such as information derivable from an electronic calendar of the user that is running on any given computing device.

In another embodiment, the user-related information may comprise a reaction of the user to one or more previously presented notifications. The presentation of a notification to one or more computing devices will be discussed more fully below. In an exemplary embodiment of the invention, the reaction of a user to a previously presented notifications may comprise at least one of the following: whether or not previously presented notifications were blocked, whether or not previously presented notifications were opened, a length of time previously presented notifications remained opened, reactions to previously presented notifications by the user on social media, and one or more biometric parameters of the user as measured by any of the computing devices 110. However, the scope of illustrative embodiments are not limited to the above-referenced reactions, but are contemplated to cover any type of measurable or detectable reaction of a user to previously presented notifications.

In another embodiment, the biometric parameters may comprise one or more of, or any combination of, heart rate measurement, blood pressure measurement, body surface temperature measurement, and pupil dilation measurement, or any type of biometric parameter that is an indicative of a biological reaction of a user upon seeing or hearing a notification presented on a computing device.

In one embodiment, one or more of the computing devices 110 may comprise biometric sensors coupled to the user for measurement of the biometric parameters associated with the user. As an exemplary embodiment, the computing device 110(1) may be a smart watch with corresponding biometric sensors, such as a heat detection sensor and/or or vibration detector and/or an audio sensor, or any sensors for measuring blood pressure and/or heart rate.

In an embodiment, the user context analyzer 210 is further configured to determine the user context of the user based upon the received user-related information. For example, user context of the user may comprise, but is not limited to, location of the user, or possible current activities of the user (e.g., in a meeting, watching television, at a sporting event), or those computing devices that the user is currently using (e.g., devices to which a user is logged-on or devices running user client services), or a preferences of the user to be presented with notifications having various types of content based upon, for example, pre-set content preferences and/or the reaction of the user to notification content associated with previously presented notifications.

In another embodiment, the user context analyzer 210 is further configured to store the determined user context of the user, and then update the determined user context based on recently-received user-related information from the computing devices 110 and the stored determined user context. In this manner, the notification system 105, via the user context analyzer 210, learns via the actions and/or reactions of the user to previously presented notifications, which may be correlated with the classifications of these previously presented notifications, thereby enriching the internal knowledge of the notification system 105 and ultimately enabling even more appropriate choices for presentations of notifications in the future.

In an embodiment of the invention, the decision manager 215 is configured to select one or more of the one or more computing devices 110 of the user according to one or more modes of presentation, based on a classification of a received notification and a determined user context of the user. For example, based upon the classification of the notification and the determined user context of the user, the decision manager 215 selects the most appropriate computing device and the most appropriate mode of presentation of the selected computing device for presenting the notification to the user.

By way of an exemplary embodiment, the notification may be an e-mail classified as time-relaxed (i.e., not very urgent) from a friend concerning sights seen on a recent vacation trip, the determined user context of the user is a laptop presentation at a business meeting, and previous reactions of the user to his friends describing sights or showing pictures of their vacations is not very positive, as based upon his social media posts to previous notifications of a similar type and/or based on user-interface interactions by the user to previous notifications and/or based on biometric parameters of the user as measured by any of the computing devices upon reception of the previous notifications of similar content. In this case, the decision manager 215 may select a mobile device of the user, and decide to present the notification to the mobile device after the meeting has ended, or in other words, postpone the presentation of the notification, according to the user's electronic calendar, for example, as a SMS text message (as the mode of presentation), or may instead decide to present the notification as an audio message (as the mode of presentation) to the laptop of the user in the evening, after the business day has concluded, for example, thereby further postponing the presentation of the notification.

By way of another exemplary embodiment, the notification may be an SMS text message classified as a high priority from a family member concerning an emergency, the determined user context of the user is a laptop presentation at a business meeting, and previous reactions of the user to family members describing urgent situations is known by the notification system 105 to be very important to the user. In this case, the decision manager 215 may select the mobile device of the user and decide to immediately present the notification to the mobile device, as a SMS text accompanied by a loud ring tone (as the mode of presentation).

In another embodiment, the decision manager 215 is configured to determine a time or times at which to present the notification to a selected one or more computing devices 110 of the user according to their respective selected modes of presentation, based on the classification of the received notification and the determined user context of the user.

According to an embodiment of the invention, a mode of presentation may comprise an audio mode, a visual mode, or a combination of audio and visual modes. Additionally, the visual mode may include, but is not limited to, notifications formatted as text messages, e-mail messages, chat messages, Skype messages, tweets, and pictures. The audio mode may comprise notifications formatted as any type of audio message, as known to those of skill in the art. A combination of audio and visual may modes include notifications formatted as movie messages, such as governed by the MPEG standard, by way of example. Additionally, a mode of presentation may include an alarm mode and/or a vibration mode, or any type of technique of alerting a user to the notification received from the notification system 105.

In another embodiment of the invention, the decision manager 215 may be configured to select one or more of the one or more computing devices 110 of the user according to one or more modes of presentation, based on the classification of the received notification, the determined user context of the user, and further based on one or more characteristics of the one or more computing devices 110. The decision manager 215 may also be configured to store the one or more characteristics of each of the computing devices 110.

In one embodiment, a characteristic of the computing device 110(1) may include, but is not limited to, any combination of an audience characteristic, an impact characteristic, a location characteristic, a receive mode characteristic and a priority characteristic. For example, an audience characteristic defines the type of audience or surroundings e.g., public, semi-private, or private, in which the device would most likely be operated. An impact characteristic, such as high, medium, or low, may define how a device may impact the attention of the user. For example, a smart watch may have a high impact, while a laptop may have a medium impact. A location characteristic may be defined by GPS coordinates, for example. A receive mode characteristic may be one or more of the different modes of presentation in which a device may possibly be used for presenting a notification. A priority characteristic may be defined as a ranking of a given computing device, with respect to other computing devices, as to the importance of such a computing device in presenting a notification to a user.

For example, if the decision manager 215 has initially selected more than one computing device with their respective modes of presentation, based on the classification of the notification, the determined user context of the user, and one or more device characteristics of each of the computing devices, except for the priority characteristics, then the device manager 215 may finally select the computing device with the highest priority characteristic for presenting the notification to the user.

The client services running on different computing devices may be governed by different communication protocol standards, and in one exemplary embodiment, the communication protocol governing a client service running on a selected computing device to which a received notification is to be presented may be different that the communication protocol governing a client service running on the computing device from which the notification is received. Thus, in another embodiment of the invention, the decision manager 215 is further configured to change the communication protocol of a received notification to the communication protocols governing the client services of the selected computing devices before presenting the notification to the selected computing devices.

Figure 3:
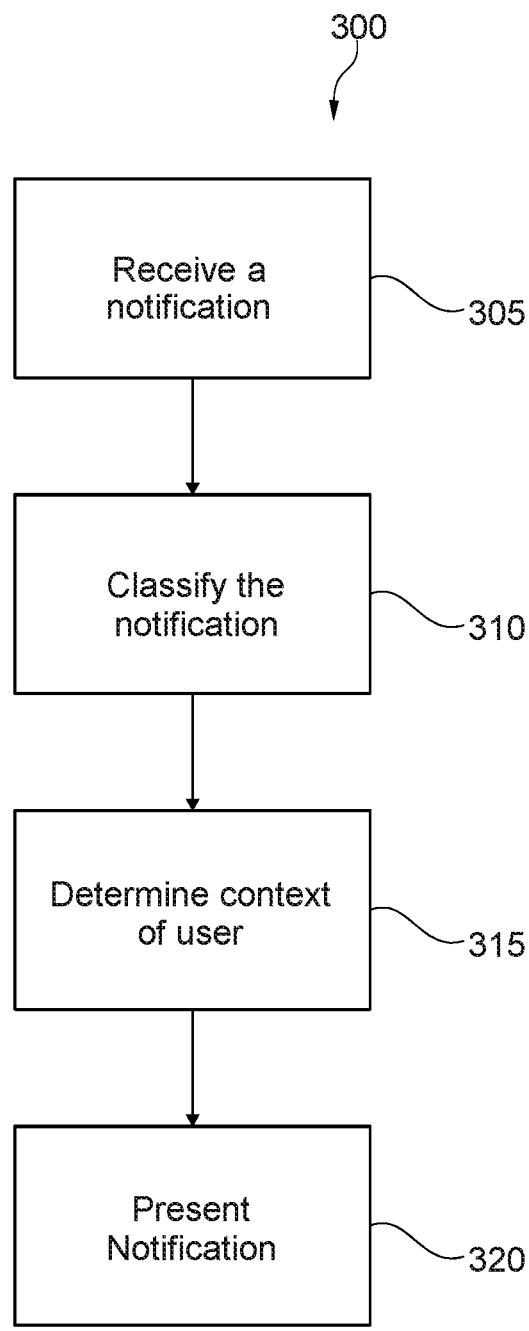
FIG. 3 is a flowchart of a method for presenting notifications to one or more computing devices of a user, according to an exemplary embodiment of the invention.

FIG. 3 is a flowchart 300 of a method for presenting notifications to one or more computing devices of a user, according to an exemplary embodiment of the invention.

In step 305, a notification analyzer 205 may receive a notification from a client service running on a computing device of one or more computing devices 110 of a user, or receive a notification from a server 115, by intercepting the notification addressed to the client service. The client service may be configured, via a plug-in, for example, to receive a notification from a server 115 running, for example, server program, and then transmit the notification to the notification analyzer 205. In another embodiment, the client service may be configured, via a plug-in, for example, to store notifications received from the server 115, and the notification analyzer 205 may monitor the client services running on the one or more computing devices 110 for any stored notifications. Upon detection of stored notifications, the notification analyzer 205 may instruct the computing devices 110 to transmit the stored notifications to the notification analyzer 205. In yet another embodiment, the notification analyzer 205 may be configured, in part, as a filter to intercept a notification sent from the server 115 and addressed to a client service running on a computing device.

In step 310, the notification analyzer 205 may, after receiving the notification, classify the notification based on content associated with the notification. In one embodiment, the notification analyzer 205 classifies the notification based on address information associated with the received notification and/or on message information of the received notification. Message information may be derived, for example, from an analysis of the semantic content of the notification, and may result in a detection of key words or phrases, or meaningful patterns, or correlations between patterns, or a detection of the urgency of the notification.

In step 315, a user context analyzer 210 may determine the user context of the user based upon received user-related information. In one embodiment, the user context analyzer may receive the user-related information from the one or more computing devices 110 of the user. In another embodiment, user-related information may comprise one or more of, but not limited to, information derivable from the interaction of the user with any of the user-interfaces of the computing devices 110, information related to a user's schedule, or a reaction of the user to one or more previously presented notifications. Furthermore, the user context analyzer 210 may store the determined user context of the user, and then update the determined user context based on recently-received user-related information from the computing devices 110 and the stored determined user context.

In step 320, a decision manager 215 may present the notification to one or more of the one or more computing devices 110 of the user according to one or more modes of presentation, based on a classification of the received notification and a determined user context of the user, and optionally further based on one or more characteristics of the one or more computing devices 110. In one embodiment, the decision manager 215 may determine a time or times at which to present the notification to the selected one or more computing devices 110 of the user according to their respective selected modes of presentation. In a further embodiment, the decision manager 215 may change the communication protocol of a received notification to the communication protocols governing the client services of the selected computing devices before presenting the notification to the selected computing devices.

The notification system 105 may be implemented as any combination of software, hardware and/or firmware, and may be implemented as a computer system such as a server, or as a component of any conventional network server or any other component of a network, e.g., a router. The computer system may include, but are not limited to, one or more processors or processing units, a storage system, a memory unit, and a bus that couples various system components including memory unit to processor. Storage system may include for example a hard disk drive (HDD). Memory unit may include computer system readable media in the form of volatile memory, such as random access memory (RAM) and/or cache memory.

Computer system typically includes a variety of computer system readable media. Such media may be any available media that is accessible by computer system, and it includes both volatile and non-volatile media, removable and non-removable media.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for presenting notifications to one or more computing devices of a user, the method comprising:
   receiving a notification addressed to a client service running on a computing device of the one or more computing devices of the user;
   classifying the notification based on content associated with the notification;
   determining user context of the user based on user-related information received from the one or more computing devices;
   responsive to determining the user context of the user based on the user-related information received from the one or more computing devices, selecting an appropriate computing device from the one or more computing devices of the user and an appropriate mode of presentation from one or more modes of presentation based on said classifying and said determining user context;
   presenting the notification to the appropriate computing device according to the appropriate mode of presentation;
   wherein said receiving said notification addressed to said client service running on said computing device further comprising monitoring, by a notification system configured as a filter running on said computing device, said client service running on said computing device for an incoming notification received from a server and intercepting, by said notification system, said incoming notification addressed to said client service running on said computing device.

2. The method of claim 1, said user-related information comprising a reaction of the user to at least one previously presented notification.

3. The method of claim 2, said reaction of the user comprising at least one of: whether or not the at least one previously presented notification was blocked, whether or not the at least one previously presented notification was opened, a length of time the at least one previously presented notification was opened, a reaction to the at least one previously presented notification by the user on social media, and one or more biometric parameters of the user as measured by the one or more of the one or more computing devices.

4. The method of claim 3, said one or more biometric parameters comprising one or more of: heart rate, blood pressure, body surface temperature and pupil dilation.

5. The method of claim 1, said user-related information comprising one or more of: an interaction of the user with one or more user interfaces of the one or more computing devices and calendar information related to the user.

6. The method of claim 1, said presenting the notification to the appropriate computing device according to the appropriate mode of presentation is further based on one or more characteristics of the appropriate computing device.

7. The method of claim 6, said one or more characteristics comprising one or more of: a location characteristic of the appropriate computing device, and a receive mode characteristic of the appropriate computing device.

8. The method of claim 1, said client service comprising one of a client messaging service or a client electronic mail service running on the computing device of the one or more computing devices of the user.

9. The method of claim 1, said content that the notification classification is based on comprises at least one of: address information of the notification and message information of the notification.

10. The method of claim 1, wherein one or more client services running on the one or more of the one or more computing devices are associated with different communication protocols than a communication protocol associated with the client service running on the computing device, and further comprising:
 changing the communication protocol of the notification before said presenting the notification to the appropriate computing device.

11. The method of claim 1, further comprising:
 storing the determined user context; and
 updating the determined user context based on recently-received user-related information from the one or more computing devices and the stored determined user context.

12. The method of claim 1, said one or more modes of presentation comprising one or more of the following: a visual mode, an audio mode, an alarm mode, and a vibration mode.

13. The method of claim 1, said presenting the notification to the appropriate computing device according to the appropriate mode of presentation further comprising postponing the presentation of the notification based on said classifying of the notification and said determining of the user context of the user.

14. The method of claim 1, further comprising:
 blocking the presentation of the notification based on said classifying of the notification and said determining of the user context of the user.

\* \* \* \* \*